United States Patent
Gifford

(10) Patent No.: US 6,195,649 B1
(45) Date of Patent: *Feb. 27, 2001

(54) DIGITAL ACTIVE ADVERTISING

(75) Inventor: David K. Gifford, Weston, MA (US)

(73) Assignee: Open Market, Inc., Cambridge, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/033,143

(22) Filed: Mar. 2, 1998

Related U.S. Application Data

(63) Continuation of application No. 08/563,745, filed on Nov. 29, 1995, now Pat. No. 5,724,424, which is a continuation of application No. 08/168,519, filed on Dec. 16, 1993, now abandoned.

(51) Int. Cl.[7] .................................................. G06F 17/60
(52) U.S. Cl. ............................... 705/75; 705/14; 705/39; 713/181
(58) Field of Search ................................... 705/26, 1, 35, 705/39, 40, 41, 42, 43, 44, 45, 50, 51, 53, 64, 65, 67, 68, 69, 70, 74, 75, 78; 713/176, 181

(56) References Cited

U.S. PATENT DOCUMENTS

| | | |
|---|---|---|
| 4,305,059 | 12/1981 | Benton .......................... 340/825.33 |
| 4,528,643 | 7/1985 | Freeny, Jr. .......................... 364/900 |

(List continued on next page.)

FOREIGN PATENT DOCUMENTS

| | | | |
|---|---|---|---|
| 0 172 670 | 2/1986 | (EP) | ................................. G07F/7/00 |
| 0-542-298-A2 | 5/1993 | (EP) | ................................. G07F/7/10 |
| 2102606 | 2/1983 | (GB) | ................................. G07F/7/10 |
| WO 91/16691 | * 10/1991 | (GB) | ................................. G07F/7/10 |
| WO 91/16691 | 10/1991 | (WO) | ................................. G07F/7/10 |
| WO 93/10503 | 5/1993 | (WO) | ................................. G06F/15/30 |

OTHER PUBLICATIONS

"Advanced Electronic Credit Authorization Through the Amherst Group, SNET", News Release, pp. 1–2, Dec. 7, 1987.*

(List continued on next page.)

Primary Examiner—Tod R. Swann
Assistant Examiner—Susanna Meinecke-Díaz
(74) Attorney, Agent, or Firm—Fish & Richardson PC

(57) ABSTRACT

A complete system for the purchasing of goods or information over a computer network is presented. Merchant computers on the network maintain databases of digital advertisements that are accessed by buyer computers. In response to user inquiries, buyer computers retrieve and display digital advertisements from merchant computers. A digital advertisement can further include a program that is interpreted by a buyer's computer. The buyer computers include a means for a user to purchase the product described by a digital advertisement. If a user has not specified a means of payment at the time of purchase, it can be requested after a purchase transaction is initiated. A network payment system performs payment order authorization in a network with untrusted switching, transmission, and host components. Payment orders are backed by accounts in an external financial system network, and the payment system obtains account authorizations from this external network in real-time. Payment orders are signed with authenticators that can be based on any combination of a secret function of the payment order parameters, a single-use transaction identifier, or a specified network address.

12 Claims, 16 Drawing Sheets

U.S. PATENT DOCUMENTS

| | | | |
|---|---|---|---|
| 4,529,870 | 7/1985 | Chaum | 235/380 |
| 4,578,530 | 3/1986 | Zeidler | 178/22.09 |
| 4,734,858 | 3/1988 | Schlafly | 364/408 |
| 4,755,940 | 7/1988 | Brachtl et al. | 364/408 |
| 4,759,063 | 7/1988 | Chaum | 380/30 |
| 4,759,064 | 7/1988 | Chaum | 380/30 |
| 4,775,935 | 10/1988 | Yourick | 364/401 |
| 4,795,890 | 1/1989 | Goldman | 235/380 |
| 4,799,156 | 1/1989 | Shavit et al. | 364/401 |
| 4,812,628 | 3/1989 | Boston et al. | 235/380 |
| 4,827,508 | 5/1989 | Shear | 380/4 |
| 4,891,503 | 1/1990 | Jewel | 235/380 |
| 4,922,521 | 5/1990 | Krikke et al. | 379/95 |
| 4,926,480 | 5/1990 | Chaum | 380/23 |
| 4,935,870 | 6/1990 | Burk, Jr. et al. | 364/200 |
| 4,947,028 | 8/1990 | Gorog | 235/381 |
| 4,947,430 | 8/1990 | Chaum | 380/25 |
| 4,949,380 | 8/1990 | Chaum | 380/30 |
| 4,977,595 * | 12/1990 | Ohta et al. | 380/24 |
| 4,982,346 | 1/1991 | Girouard et al. | 364/550 |
| 4,987,593 | 1/1991 | Chaum | 380/3 |
| 4,991,210 | 2/1991 | Chaum | 380/30 |
| 4,992,940 | 2/1991 | Dworkin | 364/401 |
| 4,996,711 | 2/1991 | Chaum | 380/30 |
| 5,025,373 | 6/1991 | Keyser, Jr. et al. | 364/408 |
| 5,060,153 | 10/1991 | Nakagawa | 364/405 |
| 5,077,607 | 12/1991 | Johnson et al. | 358/86 |
| 5,105,184 | 4/1992 | Pirani et al. | 340/721 |
| 5,220,501 | 6/1993 | Lawlor et al. | 364/408 |
| 5,247,575 | 9/1993 | Sprague et al. | 380/9 |
| 5,276,736 | 1/1994 | Chaum | 380/24 |
| 5,305,195 | 4/1994 | Murphy | 364/401 |
| 5,311,594 | 5/1994 | Penzias | 380/24 |
| 5,321,751 | 6/1994 | Ray et al. | 380/24 |
| 5,336,870 | 8/1994 | Hughes | 235/379 |
| 5,341,429 | 8/1994 | Stringer et al. | 380/23 |
| 5,347,632 | 9/1994 | Filepp et al. | 395/200 |
| 5,351,186 | 9/1994 | Bullock et al. | 364/401 |
| 5,351,293 | 9/1994 | Michener et al. | 380/21 |
| 5,383,113 | 1/1995 | Kight et al. | 364/401 |
| 5,414,833 | 5/1995 | Hershey et al. | 395/575 |
| 5,475,585 * | 12/1995 | Bush | 364/401 |
| 5,535,229 | 7/1996 | Hain, Jr., et al. | 371/53 |
| 5,557,516 | 9/1996 | Hogan | 364/406 |
| 5,557,518 | 9/1996 | Rosen | 380/24 |
| 5,557,798 | 9/1996 | Skeen et al. | 395/650 |
| 5,590,197 | 12/1996 | Chen et al. | 380/24 |
| 5,594,910 | 1/1997 | Filepp et al. | 395/800 |
| 5,596,642 | 1/1997 | Davis et al. | 380/24 |
| 5,596,643 | 1/1997 | Davis et al. | 380/24 |
| 5,604,802 | 2/1997 | Holloway | 380/24 |
| 5,621,797 | 4/1997 | Rosen | 380/24 |
| 5,623,547 | 4/1997 | Jones et al. | 380/24 |
| 5,642,419 | 6/1997 | Rosen | 380/24 |
| 5,715,314 | 2/1998 | Payne et al. | 380/24 |
| 5,724,424 | 3/1998 | Gifford | 380/24 |
| 5,920,847 * | 7/1999 | Kolling et al. | 705/40 |

OTHER PUBLICATIONS

"CompuServe Videotex Network Offers Marketing Research Service, Ad Test", Marketing News, Section 1, p. 21, Nov. 1983.*

O'Mahony, Donal, Michael Peirce, & Hitesh Tewari, Electronic Payment Systems, Artech House, Inc., pp. 145–155, Jan. 1997.*

"Underlying Security Mechanisms," Computer Fraud & Security Bulletin, Mar. 1992.*

Abadi, M. et al.; "Authentication and Delegation with Smart–Cards" Report 67; Systems Research Center; Digital Equipment Corporation; Palo Alto, California; Oct. 22, 1990, revised Jul. 30, 1992.

American National Standard; "Financial Institution Retail Message Authentication"; ANSI X9.19; 1986.

American National Standard; "Interchange Message Specification for Debit and Credit Card Message Exchange Among Financial Institutions"; ANSI x9.2; 1988.

Anderson, Ross J.; "UEPS—A Second Generation Electronic Wallet"; Proc. of the Second European Symposium on Research in Computer Security (ESORICS); Toulouse, France; pp. 411–418; Nov., 1992.

Anderson, Ross ; "Why Cryptosystems Fail"; Proc. 1st Conf. Computer and Comm. Security; pp. 215–227; Nov., 1993.

Bank Administration Institute; *Payment Systems in Eleven Developed Countries;* "United States"; pp. 215–235; 1989.

Batelaan; Butler; Chan; Chen; Evenchick; Hughes; Jen; Jeng; Millett; Riccio; Skoudis; Starace; Stoddard; "An Internet Billing Server Prototype Design"; Carnegie Mellon University; 1992.

Batelaan; Butler; Chan; Chen; Evenchick; Hughes; Jen; Jeng; Millett; Riccio; Skoudis; Starace; Stoddard; "An Internet Billing Server: System Requirements"; Carnegie Mellon University; Master of Science thesis; 1992.

Bellcore Internal E–Mail, Nov. 24, 1993.

Bender, M.; "EFTS: Electronic Funds Transfer Systems"; Kennikat Press; Port Washington, New York; pp. 43–46; 1975.

Bodner; Carlos; Evans; Garcia; Ha; Harris; Reece; Russo; Sekino; Walker; "An Internet Billing Server: Analysis of Distributed Computing and Cross Platform Issues"; Carnegie Mellon University; thesis; 1993.

Bodner; Carlos; Evans; Garcia; Ha; Harris; Reece; Russo; Sekino; Walker; "An Internet Billing Server: Availability, Reliability & Scalability Issues in the MS4 Billing Server Design & Prototype"; thesis; 1993.

Bodner; Carlos; Evans; Garcia; Ha; Harris; Reece; Russo; Sekino; Walker; "The Internet Billing Server: Design Document"; Carnegie Mellon University Information Networking Institute; Master of Science thesis; 1993.

Bodner; Carlos; Evans; Garcia; Ha; Harris; Reece; Russo; Sekino; Walker; "The Internet Billing Server: Prototype Requirements"; Carnegie Mellon University Information Networking Institute; thesis; 1993.

Bos et al.; "SmartCash: A Practical Electronic Payment System"; pp. 1–8; Aug., 1990.

Bürk et al.; "Value Exchange Systems Enabling Security and Unobservability"; *Computers & Security,* 9; pp. 715–721; 1990.

Chaum et al.; "Achieving Electronic Privacy"; *Scientific American;* pp. 319–327; 1988.

Chaum, D.L. et al.; Implementing Capability–Based Protection Using Encryption; Electronics Research Laboratory, College of Engineering, University of California, Berkeley, California; Jul. 17, 1978.

Chaum et al.; "Untraceable Electronic Cash"; *Advances in Cryptology;* pp. 319–327; 1988.

Cohen, Danny; "Electronic Commerce"; University of Southern California, Information Sciences Institute, Research Report ISI/RR–89–244; Oct., 1989.

Compuserve International; Compuserve Information Service Users Guide; pp. 109–114; 1986.

Dukach, Semyon; "SNPP: A Simple Network Payment Protocol"; MIT Laboratory for Computer Science; Cambridge, Massachusetts; 1993.

Even et al.; "Electronic Wallet"; pp. 383–386; 1983.

Gifford, David and Spector, Alfred; "Case Study: The CIRRUS Banking Network"; Comm. ACM 8, 28' pp. 797–8078; Aug., 1985.

Gifford, David K.; "Cryptographic Sealing for Information Secrecy and Authentication"; Stanford University and Xerox Palo Alto Research Center; Communications of the ACM: vol. 25, No. 4; Apr., 1982.

Gifford, David; "Notes on Community Information Systems" MIT LCS TM–419; Dec., 1989.

Gligor, Virgil D. et al.; "Object Migration and Authentication"; IEEE Transactions on Software Engineering; vol. SE–5, No. 6: Nov., 1979.

Harty et al.; "Case Study: The VISA Transaction Processing System"; 1988.

Information Network Institute, Carnegie Mellon University; Internet Billing Server; Prototype Scope Document; Oct. 14, 1993.

Intel Corporation; Power Technology; Marketing Brochure.

International Organization for Standardization; "International Standard: Bank Card Originated Messages—Interchange Message Specifications—Content for Financial Transactions"; ISO 8583; 1987.

Intuit Corp Quicken User's Guide; "Paying Bills Electronically"; pp. 171–192; 1993.

Krajewski, M. et al.; "Applicability of Smart Cards to Network User Authentication"; *Computing Systems;* vol. 7, No. 1; 1994.

Krajewski, M.; "Concept for a Smart Card Kerberos"; 15th National Computer Security Conference; Oct., 1992.

Krajewski, M.; "Smart Card Augmentation of Kerberos"; Privacy and Security Research Group Workshop on Network and Distributed System Security; Feb., 1993.

Lampson, Butler; Abadi, Martin; Burrows, Michael; and Wobber, Edward; "Authentication in Distributed Systems: Theory and Practice"; ACM Transactions on Computer Systems; vol. 10, No. 4; Nov., 1992; pp. 265–310.

Medvinsky et al.; "Electronic Currency for the Internet"; *Electronic Markets;* pp. 30–31; Sep., 1993.

Medvinsky et al.; "NetCash: A Design for Practical Electronic Currency on the Internet"; Proc. 1st ACM Conf. on Comp. and Comm. Security; Nov., 1993.

Mosaic Communications Corp. press release; "Mosaic Communications Unveils Network Navigator and Server Software for the Internet"; Sep. 12, 1994.

Needham, Roger M. and Schroeder, Michael D.; "Using Encryption for Authentication in Large Networks of Computers"; Communications of the ACM; vol. 21, No. 12; Dec., 1978; pp. 993–999.

National Westminster Bank Group; "Clearing House Automated Payments System"; pp. 1–29.

Needham, Roger M.; "Adding Capability Access to Conventional File Servers"; Xerox Palo Alto Research Center; Palo Alto, California.

Neuman, B. Clifford; "Proxy–Based Authorization and Accounting for Distributed Systems"; Proceedings of the International Conference on Distributed Computing Systems; May 25–28, 1993; Conf. 13: IEEE pp. 283–291.

Okamoto et al.; "Universal Electronic Cash"; pp. 324–337; 1991.

Pfitzmann et al.; "How to Break and Repair a 'Provably Secure' Untraceable Payment System"; pp. 338–350; 1991.

Rescorla, E. and Schiffman, A.; "The Secure HyperText Transfer Protocol"; Enterprise Integration Technologies; Jun., 1994.

Rivest, R.; "The MD5 Message–Digest Algorithm"; MIT Laboratory for Computer Science and RSA Data Security, Inc.; Apr., 1992.

Rivest, R.L. et al., "A Method for Obtaining Digital Signatures and Public–Key Cryptosystems," Laboratory for Computer Science, Massachusetts Institute of Technology, Cambridge, Massachusetts.

Schamüller–Bichl, I.; "IC–Cards in High–Security Applications"; Selected Papers from the Smart Card 2000 Conference; *Springer Verlag;* pp. 177–199; 1991.

Sirbu, Marvin A.; "Internet Billing Service Design and Prototype Implementation"; *An Internet Billing Server;* pp. 1–19; 1993.

Society for Worldwide Interbank Financial Telecommunications S.C.; "A S.W.I.F.T. Overview".

Tenebaum, Jay M. and Schiffman, Allan M.; "Development of Network Infrastructure and Services for Rapid Acquistion"; adapted from a white paper submitted to DARPA by MCC in collaboration with EIT and ISI.

Vittal, J. "Active Message Processing: Messages as Messengers"; pp. 175–195; 1981.

Voydock, Victor et al.; "Security Mechanisms in High–Level Network Protocols"; Computing Surveys; vol. 15, No. 2; Jun., 1981.

P. Rémery et al., "Le paiement électronique", pp. 15–23, 1988, *L'Écho des Recherches*, No. 134.

CCITT Blue Book, Vol. VIII; pp. 48–81, Nov. 14–25, 1988.

Takei, "Videotex Information System and Credit System Connecting with MARS–301 of JNR," *Japanese Railway Engineering,* No. 94, Sep. 1985, pp. 9–11.

Pongratz, et al, "IC Cards in Videotex Systems," *Smart Card 2000,* 1989, pp. 179–186.

Waidner, et al, "Loss–Tolerance for Electronic Wallets," *Fault–Tolerant Computing: 20th International Symposium,* Jun. 1990, pp. 140–147.

Floch, *Privacy Protected Payments: An Implementation of a Transaction System,* Dec. 1988, pp. 1–28.

Beutelspacher, et al, "Payment Applications with Multifunctional Smart Cards," *Smart Card 2000: The Future of IC Cards,* Oct. 1987, pp. 95–101.

Tanaka, et al, "Untraceable Electronic Funds Transfer System," *Electronics and Communications in Japan,* 1989, pp. 47–54.

Perry, "Electronic Banking Goes to Market," *IEEE Spectrum,* Feb. 1988, pp. 46–49.

Hakola, et al, "A System for Automatic Value Exchange," *Proceedings—Fall Joint Computer Conference,* 1966, pp. 579–589.

"CompuServe Videotex Network Offers Marketing Research Service, Ad Test," *Marketing News,* Nov. 25, 1983 p. 21.

Fujioka, et al, "ESIGN: An Efficient Digital Signature Implementation for Smart Cards," *Advances in Cryptology– Eurocrypt '91,* Apr. 1991, pp. 446–457.

"Electronic In–Home Shopping: "Our Stores are Always Open"," *Chain Store Age Executive,* Mar. 1985, pp. 111,116.

"Suddenly, Videotex is Finding an Audience," *Business Week,* Oct. 19, 1987, pp. 92–94.

Staskauska, "The Formal Specification and Design of a Distributed Electronic Funds Transfer System," *IEEE Transactions on Computers,* Dec. 1998, pp. 1515–1528.

Stol, *Privacy Protected Payments–A Possible Structure for a Real Implementation and Some Resource Considerations,* Feb. 1998.

Ph. van Heurch, "TRASEC: Belgian Security System for Electronic Funds Transfers," *Computers & Security,* 1987, pp. 261–268.

Weber, "Controls in Electronic Funds Transfer System," *Computers & Security,* 1989, pp. 209–221.

Shain, "Security in Electronic Funds Transfer System," *Computers & Security,* 1989, pp. 123–137.

Burk, et al, "Digital Payment Systems Enabling Security and Observability," *Computers & Security,* 1989, pp. 399–415.

Andrade, et al, "Open On–Line Transaction Processing with the Tuxedo System," *COMPCON* Spring 1992, Feb. 1992, pp. 366–371.

Damgard, "Payment Systems and Credential Mechanisms with Provable Security Against Abuse by Individuals," *Advances in Cryptology—CRYPTO '88,* 1988, pp. 328–325.

Tunstall, "Electronic Currency," *Smart Card 2000: The future of IC Cards,* Oct. 1987, pp. 47–48.

Strazewski, "Computerized Service Sets Shoppers Hacking," *Advertising Age,* Feb. 22, 1988, p. 62.

Messmer, "NIST Stumbles on Proposal for Public Key Encryption," *Network World,* Jul. 27, 1992, p. 1.

Knapskog, Privacy Protected Payments– Relization of a Protocol That Guarantees Payor Anonymity, *Advances in Cryptology–Eurocrypt '88,* May 1988, pp. 107–122.

"Redcoats Join Communications Fight." *Industry Week,* Feb. 22, 1982, pp. 108–109.

Williams, "Debit Program Cuts Fraud; CompuServe Plan a Success," *Pensions & Investment Age,* Feb. 4, 1985, pp. 21, 32.

Consumers Plugging Into New Electronic Mall, *Advertising Age,* Mar. 4, 1985. p. 74.

"Taking Advantage of the Past," *Advertising Age,* Apr. 11, 1983, pp. M36–M37.

"Mall Offers Holiday Treat for Hackers," *Advertising Age,* Nov. 13, 1985, p. 76.

Kenny, "EDI Security: Risks and Solutions," *COMPSEC 1992; The Ninth World Conference on Computer Security, Audit, and Control,* Nov. 1992, pp. 341–352.

Ferrarini, "Direct Connections for Software Selections," *Business Computer Systems,* Feb. 1984, pp. 35–38.

Cohen, Danny; "Computerized Commerce"; ISI Reprint Series ISI/RS–89–243; Oct., 1989; Reprinted from Information Processing 89, Proceedings of the IFIP World Computer Congress, held Aug. 28–Sep. 1, 1989.

Davies, D.W. and Price, W.L.; "Security for Computer Networks: An Introduction to Data Security in Teleprocessing and Electronic Funds Transfer"; John Wiley & Sons; Dec. 5, 1985; pp. 304–336.

Jansson, Lennart; "General Electronic Payment System"; 7th Proceedings of the International Conference on Computer Communication; pp. 832–837; 1985.

Mak, Stephen; "Network Based Billing Server"; Carnegie Mellon University Information Networking Institute; Masters of Science thesis; 1991.

Miller, S.P.; Neuman, B.C.; Schiller, J.I.; Saltzer, J.H.; "Kerberos Authentication and Authorization System"; Project Athena Technical Plan, Section E.2.1; Massachusetts Institute of Technology; Oct., 1988.

* cited by examiner

| CLIENT COMPUTER | PAYMENT COMPUTER | REAL-TIME FINANCIAL AUTHORIZATION NETWORK |

Construct Payment Order
|
Add Tranasction Identifer as — 93
part of Authenticator
| Payment Order
|———————————▶
            |
            Verify Authenticator and
            Confirm Transaction      — 94
            Identifer is One Expected
            |
            |
            |

FIG. 15

DIGITAL ACTIVE ADVERTISING

This is a Continuation of application Ser. No. 08/563,745, filed Nov. 29, 1995, now U.S. Pat. No. 5,724,424, which is a Continuation of application Ser. No. 08/168,519, filed Dec. 16, 1993, now abandoned.

BACKGROUND OF THE INVENTION

The recent rapid growth of information applications on international public packet-switched computer networks such as the Internet suggests that public computer networks have the potential to establish a new kind of open marketplace for goods and services. Such a marketplace could be created with a network sales system that comprises a plurality of buyer and merchant computers, means for the users of the buyer computers to display digital advertisements from the merchant computers, and means for the users to purchase products described by the advertisements.

A network based sales system will need to allow users to preview products at little or no cost, and will need to make a large number of product advertisements available in a convenient manner. In addition, the shopping system will need to include easy-to-use facilities for a user to purchase desired products using a merchant independent payment method. In addition the network sales will need to allow new buyers and merchants to enter the market.

A central requirement for a marketplace is a payment mechanism, but at present no merchant independent payment mechanism is available for computer networks that permits users to utilize conventional financial instruments such as credit cards, debit cards, and demand deposit account balances. We expect that both retail payment and wholesale payment mechanisms will be required for networks, with consumers using the retail mechanism for modest size purchases, and institutions using the wholesale mechanism for performing settlement between trading partners. For wide acceptance the retail mechanism will need to be a logical evolution of existing credit-card, debit-card, and Automated Clearing House facilities, while for acceptance the wholesale mechanism will need to be an evolved version of corporate electronic funds transfer.

These problems of have been approached in the past by network based sales systems wherein, for example, each merchant maintains an account for each user. A user must establish an account with each merchant in advance in order to be able to utilize the merchant. The prior art network based sales systems are not designed to allow users to use their existing credit card and demand deposit accounts for payment, nor are they designed to allow for programs to be included in digital advertisements.

According, therefore, it is a primary objective of this invention to provide a user interactive network sales system in which the user can freely use any merchant of choice and utilize existing financial instruments for payment. Other objects include a network sales system which provides a high-quality user interface, which provides users with a wide variety and large volume of advertisements, which is easily extensible to new services, and which is easily expanded to new applications within the existing infrastructure of the system.

Still other objects of the invention are to provide a network payment system that will authorize payment orders and remove part of the risk of fraud from merchants.

An unavoidable property of public computer networks is that they are comprised of switching, transmission, and host computer components controlled by many individuals and organizations. Thus it is impossible for a network payment system to depend upon a specified minimum required degree of software, hardware, and physical security for all of the components in a public network. For example, secret keys stored in a given user's personal computer can be compromised, switches can be tampered with to redirect traffic, and transmission facilities can be intercepted and manipulated.

The risk of performing retail payment in a public network is compounded by statutes that make a payment system operator in part liable for the security lapses of its users. Existing Federal statutes in the United States, including the Electronic Funds Transfer Act and the Consumer Credit Protection Act, require the operator of a payment mechanism to limit consumer liability in many cases. Payment system operators may have other fiduciary responsibilities for wholesale transactions. Similar responsibilities exist in other countries for retail and wholesale transactions.

In existing credit card payment systems, a credit card's issuing bank takes on the fraud risk associated with misuse of the card when a merchant follows established card acceptance protocols. Acceptance protocols can include verifying a card holder's signature on the back of their card and obtaining authorization for payments over a certain value. However, in network based commerce a merchant can not physically examine a purchasers credit card, and thus the fraud risk may revert to the merchant in so called "card not present" transactions. Many merchants can not qualify to take this risk because of their limited financial resources. Thus the invention is important to allow many merchants to participate in network based commerce.

Other objects of the invention include utilizing existing financial instruments such as credit cards, debit cards, and demand deposit accounts for merchant payments.

Existing network payment systems do not connect to the financial system for authorization and are not compatible with conventional financial instruments. Existing network payment systems include the Simple Network Payment Protocol [Dukach, S., SNPP: A Simple Network Payment Protocol, MIT Laboratory for Computer Science, Cambridge, Mass., 1993.], Sirbu's Internet Billing Server [Sirbu, M. A., Internet Billing Service Design and Prototype Implementation, Information Networking Program, Carnegie-Mellon University, 1993], and NetCash [Medvinsy, G., and Newman, B. C., NetCash: A Design for Practical Electronic Currency on the Internet, Proc. 1st ACM Conf. on Comp. and Comm. Security, November, 1993].

A further object of the invention is to allow users in an untrusted network environment to use conventional financial instruments without requiring modification to existing financial system networks.

The following definitions apply to the present invention. A principal is a person, company, institution, or other entity that is authorized to transact business as part of a network payment system. A payment order describes the identity of a sender, a payment amount, a beneficiary, and a sender unique once. A sender is a principal making a payment. A beneficiary is a principal to be paid by the payment system. A sender unique nonce is an identifier that is used only once by a given sender. An example of sender unique nonces are unique timestamps. An external account is an account that can be used to settle a payment order for either a sender or a beneficiary in the external financial system. Examples of external accounts include demand deposit accounts and credit card accounts. An external device is a physical object that is kept in the possession of a user for the purpose of identifying the user.

A network payment system is a service that authorizes and executes digital payment orders that are backed by external accounts. A payment system authenticates a payment order, checks for sufficient funds or credit, and then originates funds transfer transactions to carry out the payment order. A payment system acknowledges acceptance or rejection of a payment order. More than one payment system may exist on a given network, and a given payment system may operate on more than one host to increase its reliability, availability, and performance. An authenticator is a digital value that is appended to a payment order and becomes part of the payment order that authenticates the payment order as genuine.

SUMMARY OF THE INVENTION

The invention relates to a network sales system for enabling users to purchase products using a plurality of buyer computers that communicate over a network with a plurality of merchant computers. Each merchant computer has a database of digital advertisements. Each digital advertisement includes a price and a product abstract. Buyer computers request, display, and respond to digital advertisements from merchant computers. Users can purchase products with their buyer computers after they have specified an account to pay for the purchase. A network payment service is used to authorize the purchase before merchant fulfillment is performed.

In a particular aspect of the invention, the merchant computer can request account information when it is not provided by the buyer computer. In another aspect of the invention, the buyer computer can present to a merchant a pre-authorized payment order that is obtained from a network payment system.

In another aspect of the invention, an electronic sales system contains digital advertisements that include programs. The programs are executed on behalf of a user by a buyer computer, and can lead to a purchase request directed to a merchant computer that performs product fulfillment.

In another aspect of the invention a network payment system executes payment orders. A payment order includes a sender, a beneficiary, a payment amount, and a nonce identifier. A payment order is signed by a client computer with an authenticator that is checked by the payment system. Payment orders are backed by accounts in the banking system, and are authorized by the network payment system by sending messages into a financial authorization network that knows the status of these accounts. The payment system accomplishes settlement by sending messages into an existing financial system network.

In another aspect, payment orders are authenticated based on the delivery address they specify. In another aspect, the payment system will specify in its authorization legal delivery addresses. In another aspect, authenticators for payment orders are based on one-time transaction identifiers that are known only to the user and the payment system. In another aspect, payment orders for a given sender are only accepted from certain client computer network addresses. In another aspect, the network payment system sends messages into a financial authorization system in real-time before the network payment system will authorize a payment order.

BRIEF DESCRIPTION OF THE DRAWINGS

Other objects, features, and advantages of the invention will appear from the following description taken together with the drawings in which:

FIG. 15 is a flow chart illustrating an alternate processing of the authentication and verification of a payment order where transaction identifiers are used.

DESCRIPTION OF A PARTICULAR PREFERRED EMBODIMENT

Figure 1:
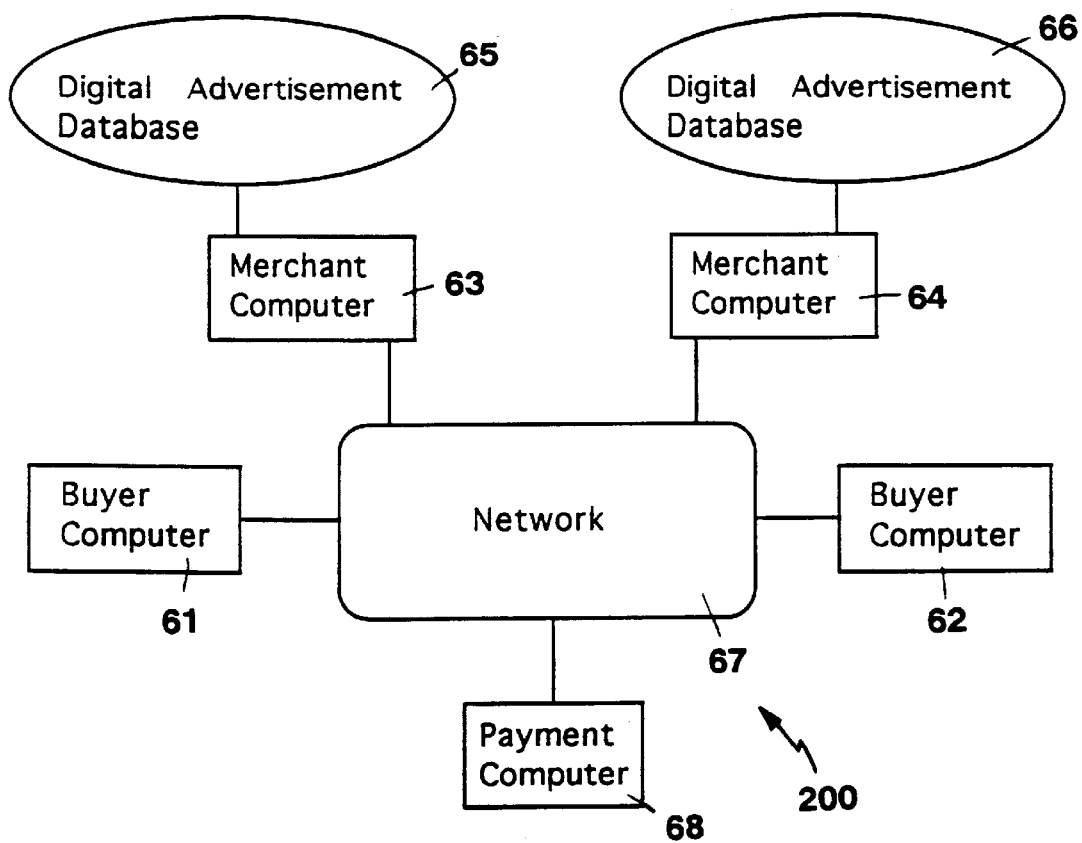
FIG. 1 is a block diagram of a typical network sales system in accordance with the invention.

A network sales system 200 as shown in FIG. 1 employs a network 67 to interconnect a plurality of buyer computers 61 and 62, merchant computers 63 and 64, each merchant computer with respective digital advertisement databases 65 and 66, and a payment computer 68. A user of the system employs a buyer computer to retrieve advertisements from the merchant computers, and to purchase goods of interest. A payment computer is used to authorize a purchase transaction.

A digital advertisement includes a product description and a price. In digital advertisement database 65 prices and descriptions may be stored separately, and one price may apply to many product descriptions.

In an alternate embodiment, the network sales system further includes external devices that are kept in the possession of users so that the users can authenticate themselves when they use a buyer computer.

The software architecture underlying the particular preferred embodiment is based upon the hypertext conventions of the World Wide Web. Appendix A describes the Hypertext Markup Language (HTML) document format used to represent digital advertisements, Appendix B describes the HTML forms fill out support in Mosaic 2.0, Appendix C is a description of the Hypertext Transfer Protocol (HTTP)

between buyer and merchant computers, and Appendix D describes how documents are named with Uniform Resource Locators (URLs) in the network of computers. A document is defined to be any type of digital data broadly construed, such as multimedia documents that include text, audio, and video, and documents that contain programs.

Figure 2:
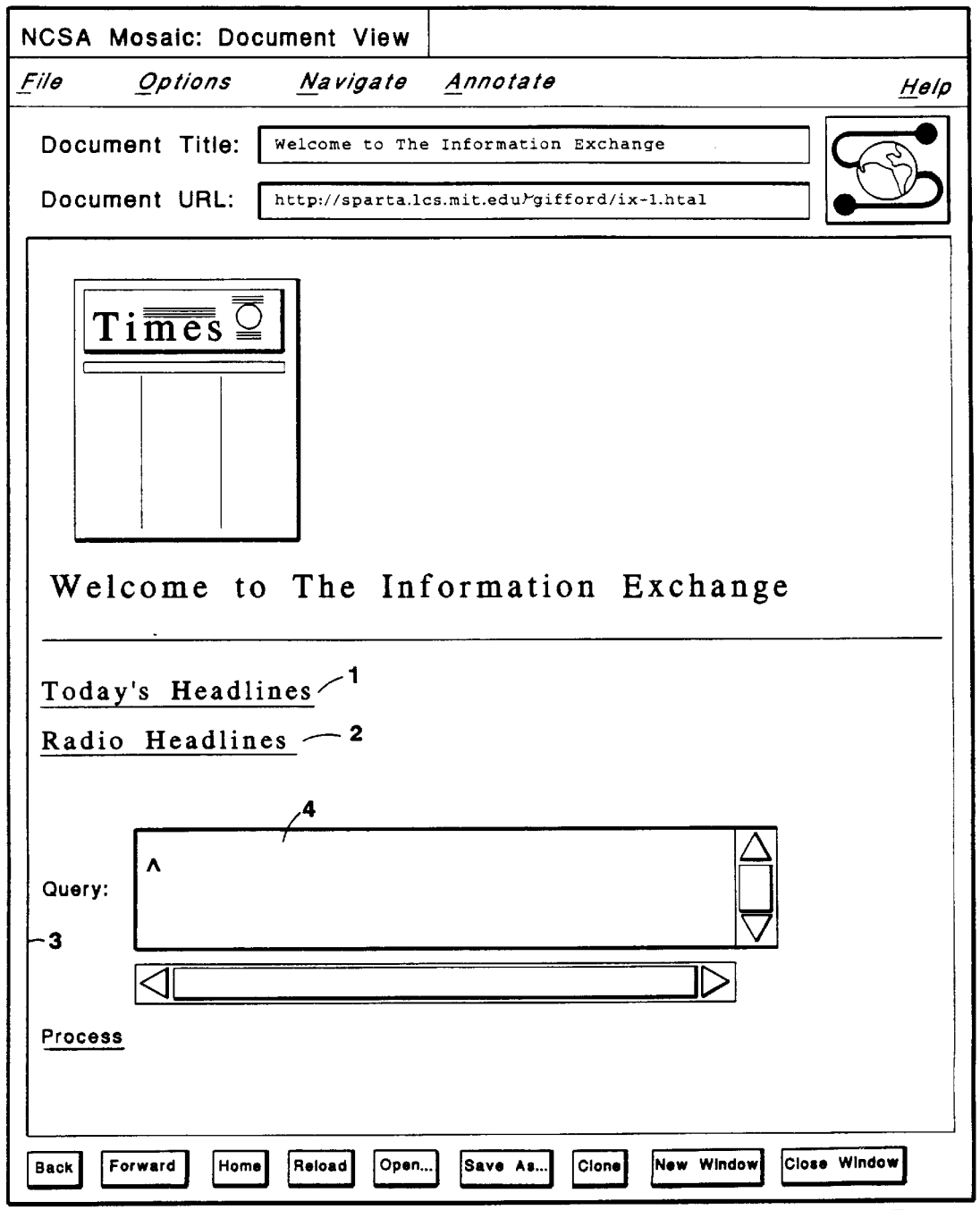
FIG. 2 is a screen snapshot of a buyer computer display of an overview page from a merchant computer.
Figure 3:
FIG. 3 is a screen snapshot of a buyer computer display of a page of digital advertisements from a merchant computer.

FIG. 2 shows an overview screen that has been retrieved from a merchant computer by a buyer computer and displayed by the buyer computer. It includes links 1, 2, and 3 that when activated by a user cause the buyer's computer to take specified actions. In the case of link 1, the document shown in FIG. 3 is retrieved from a merchant computer and displayed. In the case of link 2, a short audio segment is retrieved from a merchant computer and played. In the case of link 3, the query that can be entered into the query dialog box 4 is sent to a merchant computer, and a document is retrieved from the merchant computer and displayed.

FIG. 3 shows a document that contains three digital advertisements. The digital advertisements have been retrieved from the merchant computer after the activation of link 3. The merchant computer may set the prices contained in the advertisements based on the on the identity of the user as determined, for example, by the network address of the requesting buyer computer. The document includes links 5, 6, and 7 that are used to purchase the products described by the advertisements. For example, if link 5 is activated the missing payment information document shown in FIG. 4 is retrieved from the merchant computer and displayed.

Figure 4:
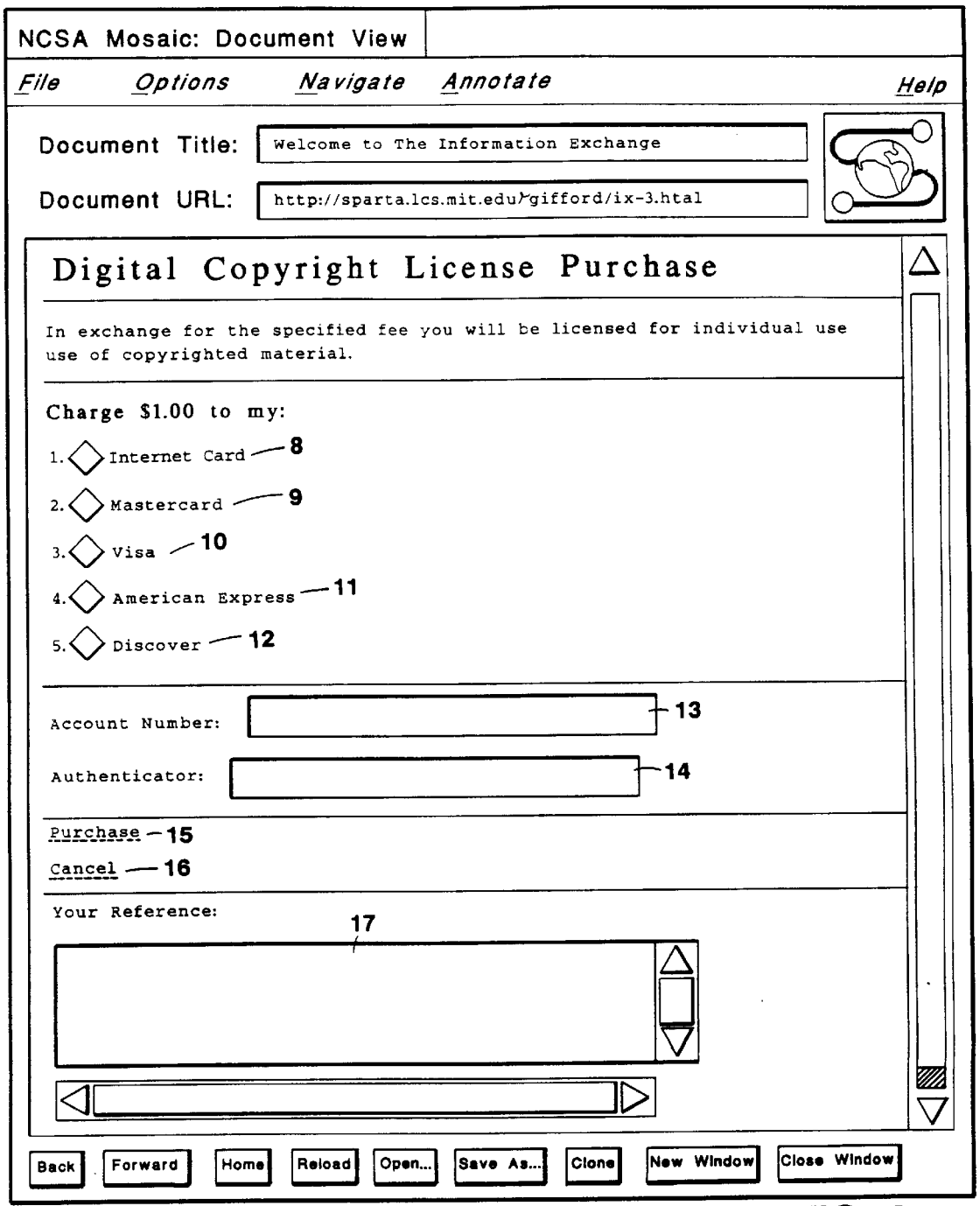
FIG. 4 is a screen snapshot of a buyer computer display of an account query page.

FIG. 4 is a missing payment information document that is used to gather user account information for the requested purchase in an HTML form. Radio buttons 8, 9, 10, 11, 12 are used to select a means of payment, dialog box 13 is used to enter an account number, dialog box 14 is used to enter an optional authenticator for the account, purchase button 15 is used to send the account information to the merchant computer and proceed with the purchase, link 16 is used to abort the purchase and return to the document shown in FIG. 2, and dialog box 17 is used to enter optional user information that is associated with the purchase and ultimately used by a financial institution as part of a textual billing identifier for the purchase transaction. If provided, this additional information is included in the payment order for the purchase.

Figure 5:
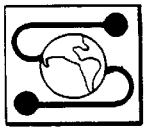
FIG. 5 is a screen snapshot of a buyer computer display of a fulfillment page.

FIG. 5 is a fulfillment document 18 that is produced once valid account information is provided to the missing payment information document in FIG. 4 and purchase button 15 is activated.

Figure 6:
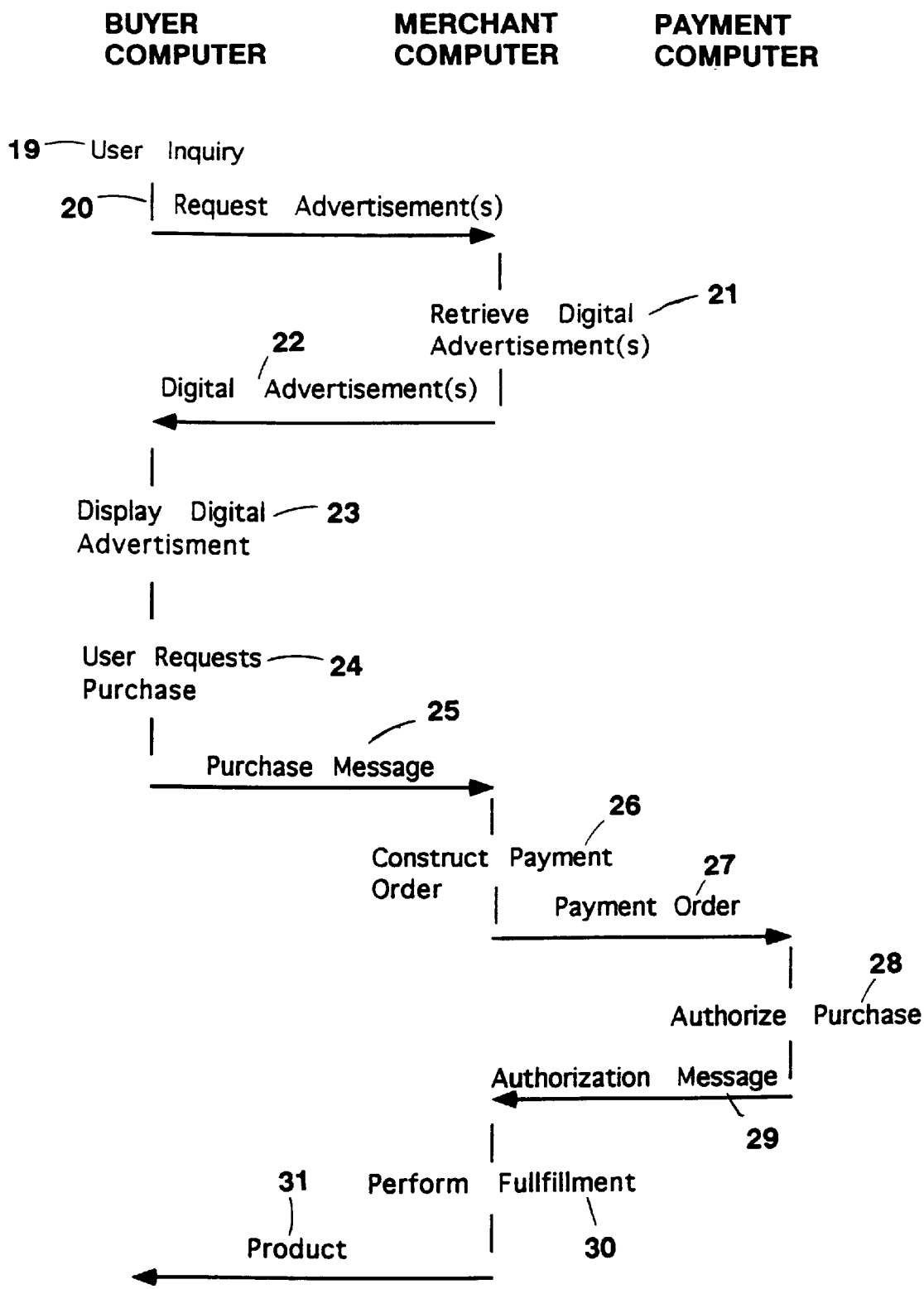
FIG. 6 is a flow chart illustrating the processing of a sale between a buyer computer and a merchant computer.

FIG. 6 is a flowchart that more fully describes the information flow in the purchase transaction shown in FIGS. 2 to 5. An initial user inquiry 19 from activating link 1 results in the HTTP request 20 for a specific document with a specified URL. The URL specifies the name of the merchant computer. The merchant computer retrieves the document given the URL at 21, and returns it to the buyer computer at 22. The buyer computer displays the resulting HTML document at 23. When the user activates link 5, an HTTP request 25 is sent to the merchant computer requesting the document.

In an alternate embodiment, document 22 is executed at 23 as a program. A program is defined as a set of instructions that can exhibit conditional behavior based upon user actions or the environment of the buyer computer. As is known to those skilled in the art, there are many techniques for representing programs as data. The program can be interpreted or it can be directly executed by the buyer computer. The program when executed will cause the buyer computer to interact with the user leading to the user purchase request 24, and the purchase message 25.

The merchant computer then attempts to construct a payment order at 26 using the information it has gathered about the user. The buyer computer may have previously supplied certain credentials using fill out forms or other account identification means such as providing the network address of the buyer computer in the normal course of communication. If the buyer computer is able to construct a complete payment order at 26 the payment order is sent to a payment computer for authorization at 27. If a payment order can be constructed, processing continues at 28.

Alternatively, the buyer computer may construct the payment order at 24 and send it to the merchant computer at 25. In this case, the payment order assembly steps at 26, at the merchant computer, may only need to forward the payment order from the buyer computer.

A payment order includes user account information, merchant account information, an amount, and a nonce identifier that has not been previously used for the same user account. Variations of payment orders can be constructed, including payment orders that specify user or merchant identifiers in place of account information, payment orders that specify a valid time period, payment orders that specify foreign currencies, and payment orders that include comment strings. Part of the process of constructing a payment order is creating a corresponding authenticator using one of the authenticator methods described below.

Figure 7:
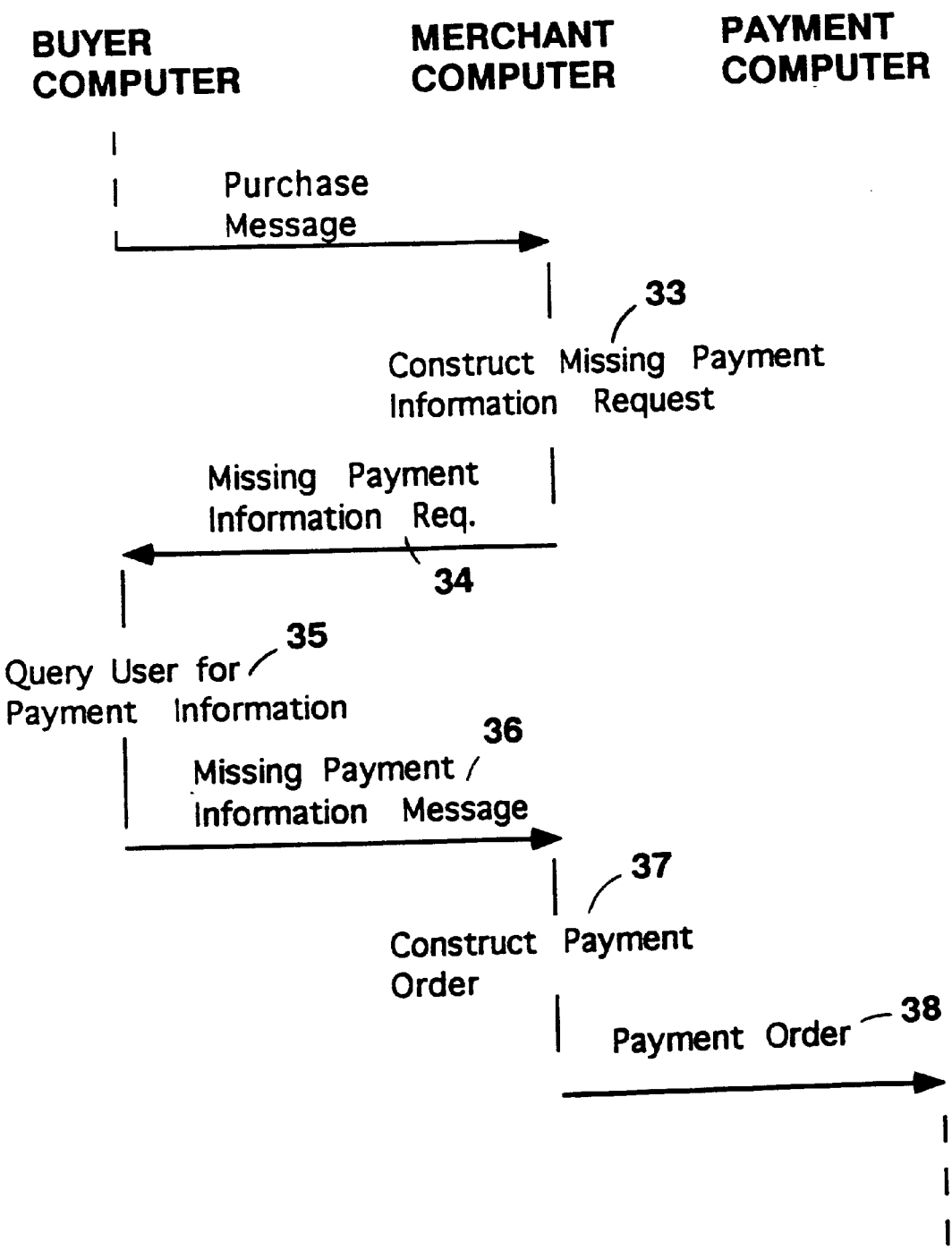
FIG. 7 is a flow chart illustrating the alternate processing of payment order means for obtaining missing payment information.

In the illustrated embodiment of FIGS. 3 and 4, the merchant computer does not have sufficient information to construct a payment order at 26 and thus at 33 (FIG. 7) constructs and returns a missing payment information document in response to request 25. Operation 33 includes in the constructed document appropriate form fields based on what information the merchant computer has already collected from the user. The document is returned to the buyer computer at 34 and is displayed at 35. When the user presses the purchase button 15, the contents of the form are transmitted to the merchant computer, at 36, to a specific URL name, using an HTTP request. Based on the supplied form fields, the merchant computer constructs a complete payment order. Alternatively, the buyer computer may construct the payment order at 35 and send it to the merchant computer as part of step 36. In this case, the payment order assembly steps 37 at the merchant computer simply passes on the payment order from the buyer computer. The payment order is sent to the payment computer in a message at 38.

In either case, the flowchart continues in FIG. 6 where the payment computer checks the authorization of the payment order at 28. If the payment system authorizes the request, an authorization message at 29 is returned to the buyer computer, and the merchant computer checks at 30 that the authorization message came from the payment computer using the authenticator mechanism described below. Assuming that the authorization message is valid, the merchant computer performs fulfillment at 30, returning the purchased product in response at 31. In our example in FIG. 5 the response at 31 is document 18 that was the logical target of link 5. If the payment system does not authorize the payment order then response 31 is a rejection of the user's purchase request.

In an alternate embodiment, step 30 can encrypt the document using a key that is known to the buyer computer. As is known to those skilled in the art, the key can be communicated to the merchant computer using convention key distribution protocols. In this manner the document will be protected from disclosure to other users.

The fulfillment step at 30 can alternatively schedule a physical product to be shipped via ordinary mail or other means. This can be accomplished by updating a fulfillment request database or by sending a message to a shipping system. In this case the response at 31 is a confirmation that the product has been scheduled to ship. In this way the network sales system can implement an electronic mail order system.

FIGS. 8, 9, 10, and 11 show a second example that uses query based access to digital advertisements. It is assumed that the previous example was used by the user immediately before at the same buyer computer.

Figure 8:
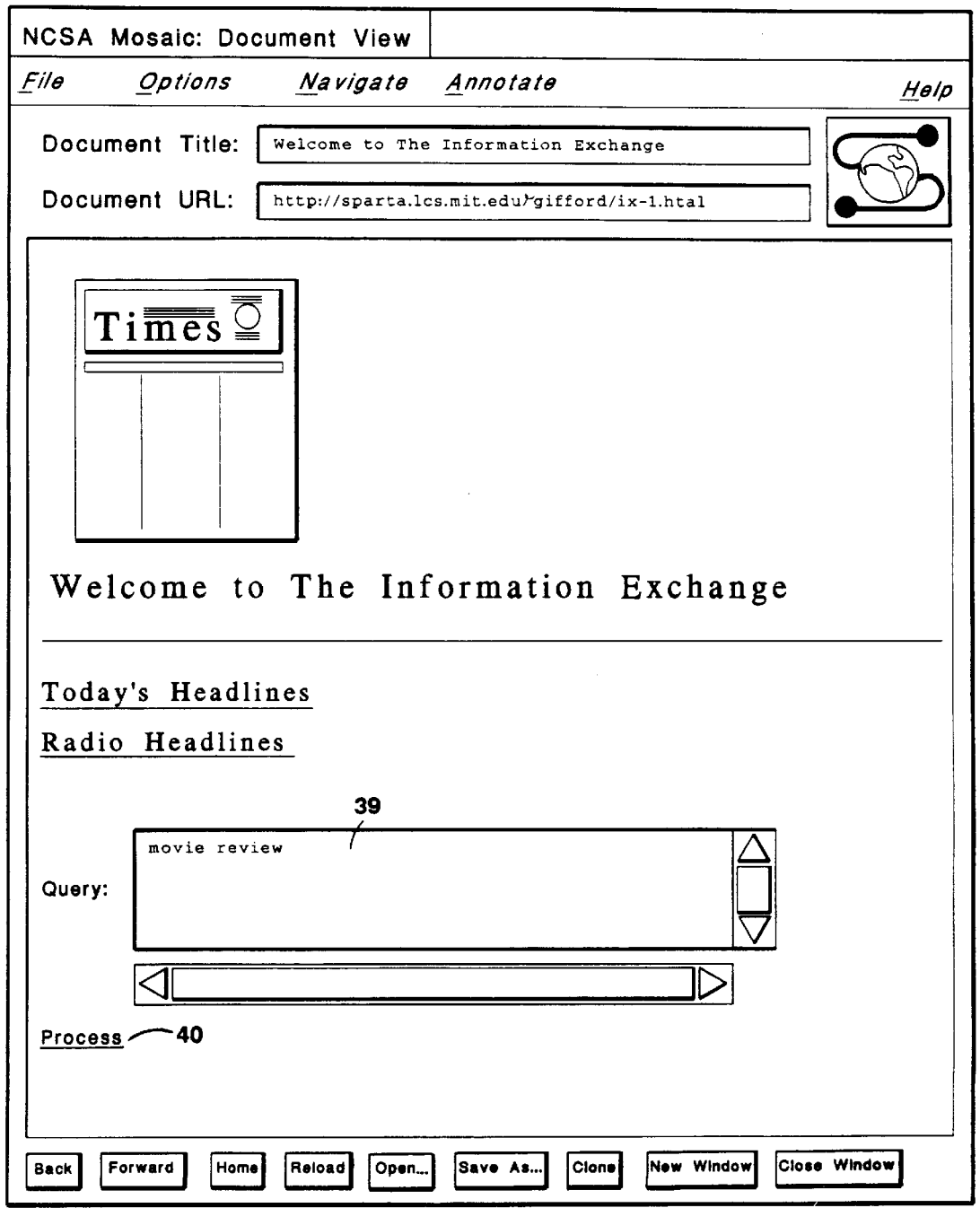
FIG. 8 is a screen snapshot of a buyer computer display of an overview page from a merchant computer that contains a query input by the user.

FIG. 8 shows the overview screen where the query "movie review" has been entered into dialog box 39. When the user activates process button 40, the merchant searches databases as described by the URL attached to button 40, and creates a response document as shown in FIG. 9.

Figure 9:
FIG. 9 is a screen snapshot of a buyer computer display of digital advertisements in response to a user's query.

FIG. 9 shows digital advertisements 39, 40, 41, 42, 43, and 44 that were found in response to the query initiated by button 40. A scroll bar 45 shows that there are additional digital advertisements that are not shown. When link 46 is activated, the missing account information document shown in FIG. 10 is returned by the merchant computer.

Figure 10:
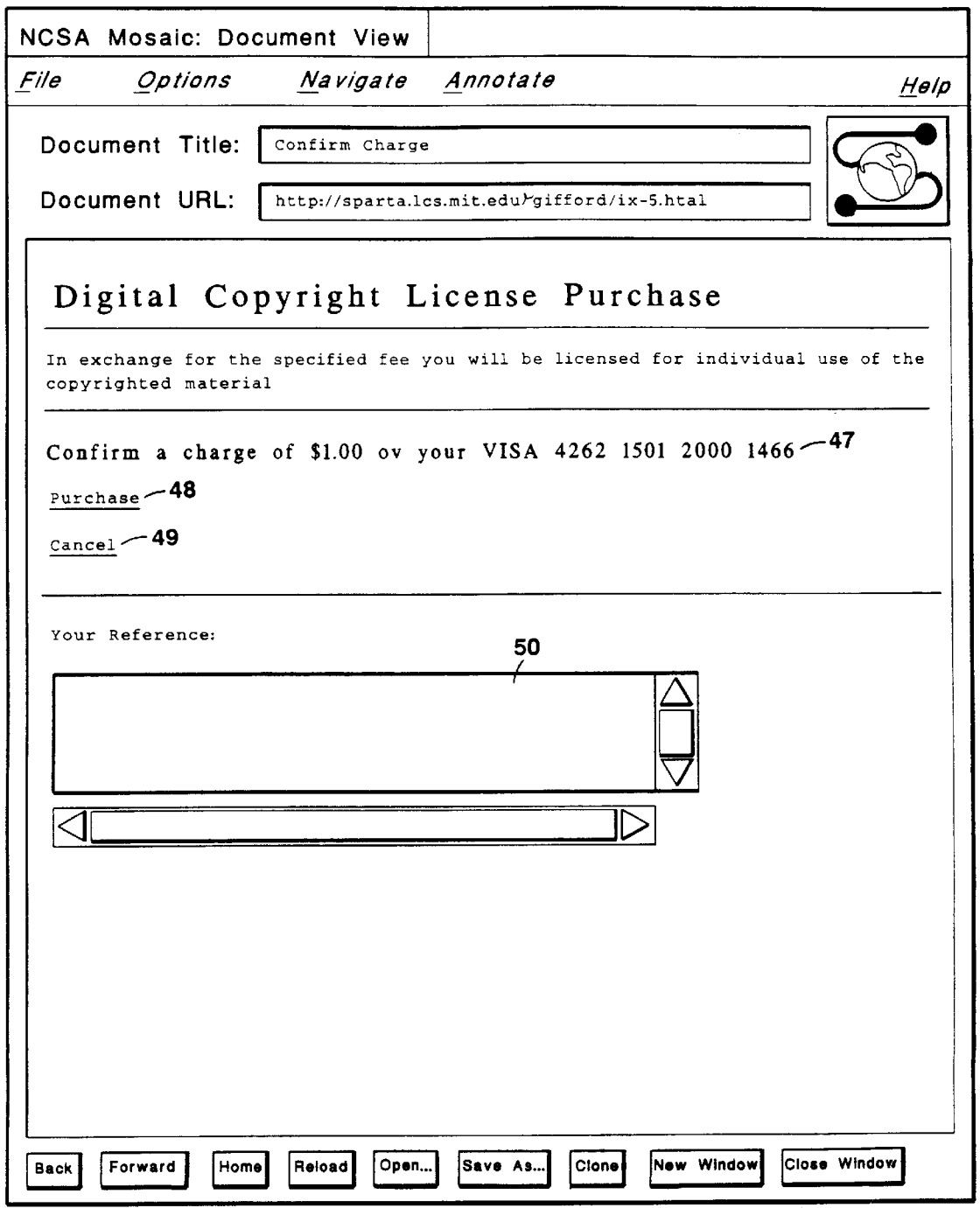
FIG. 10 is a screen snapshot of a buyer computer screen of a purchase confirmation.

FIG. 10 shows that the merchant computer has partial information on the buyer's account. Message 47 shows that the merchant computer already knows the buyer's account number. Purchase button 48 will send the optional user reference string in dialog box 50 to the merchant computer described by the URL behind button 48 and purchase the product corresponding to digital advertisement 39. Cancel link 49 will return the user to the document shown in FIG. 2.

Figure 11:
FIG. 11 is a screen snapshot of a buyer display of a fulfillment page like FIG. 5.

When purchase button 48 is activated, a document 51 is sent by the merchant computer and displayed by the buyer computer as shown in FIG. 11.

Figure 12:
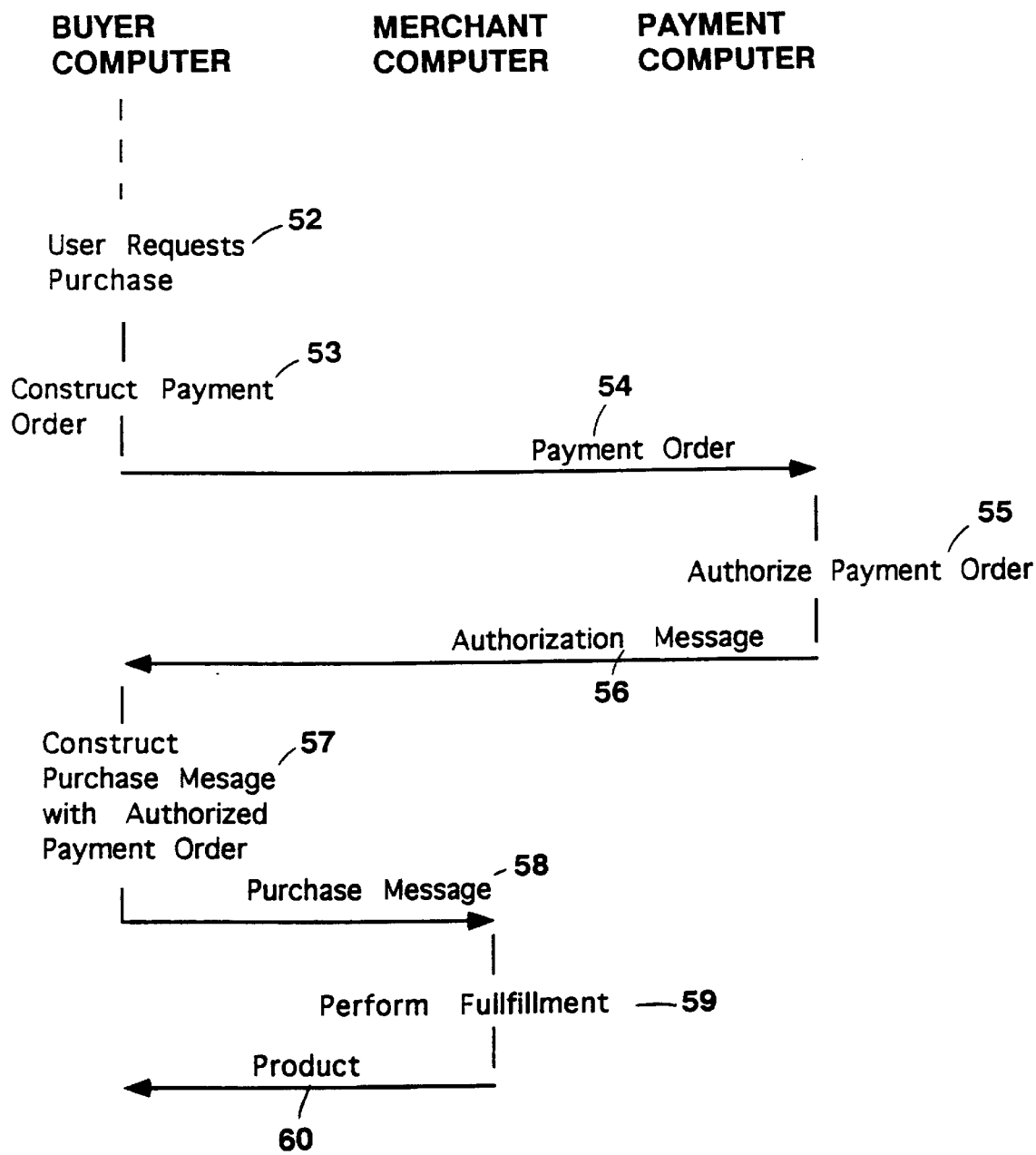
FIG. 12 is a flow chart illustrating an alternate processing of a sale between a buyer computer and a merchant computer where a payment order is pre-authorized.

FIG. 12 shows an alternative method of processing a sales transaction. In this method when the user requests a purchase at 52, the buyer computer constructs a payment order at 53 and sends it for approval to the payment computer at 54. The payment computer authorizes the payment order at 55; and when the payment order is authorized, returns an unforgable certificate at 56 that the payment order is valid. Means of creating such unforgable certificates are described in authenticator method number one below. If at step 55 the payment order is not authorized, a rejection message is sent at 56 and the sales transaction is terminated.

The buyer computer then proceeds at 57 to send a pre-authorized purchase request to the merchant computer. The unforgable certificate 56 is included in a purchase message at 57 that is sent at 58 to the merchant computer. Based upon the pre-authorized payment order the merchant computer performs fulfillment at 59 and returns the product at 60. In a variation, the merchant computer at 59 checks to ensure the payment order has not been previously used. This can be accomplished by checking with a payment computer or maintaining a merchant computer database of previously accepted payment orders. The unforgable certificate created at step 56 does not need to include the user account information. This variation is useful if the user wishes to make purchases and remain anonymous to the merchant.

A Network Payment System

Figure 13:
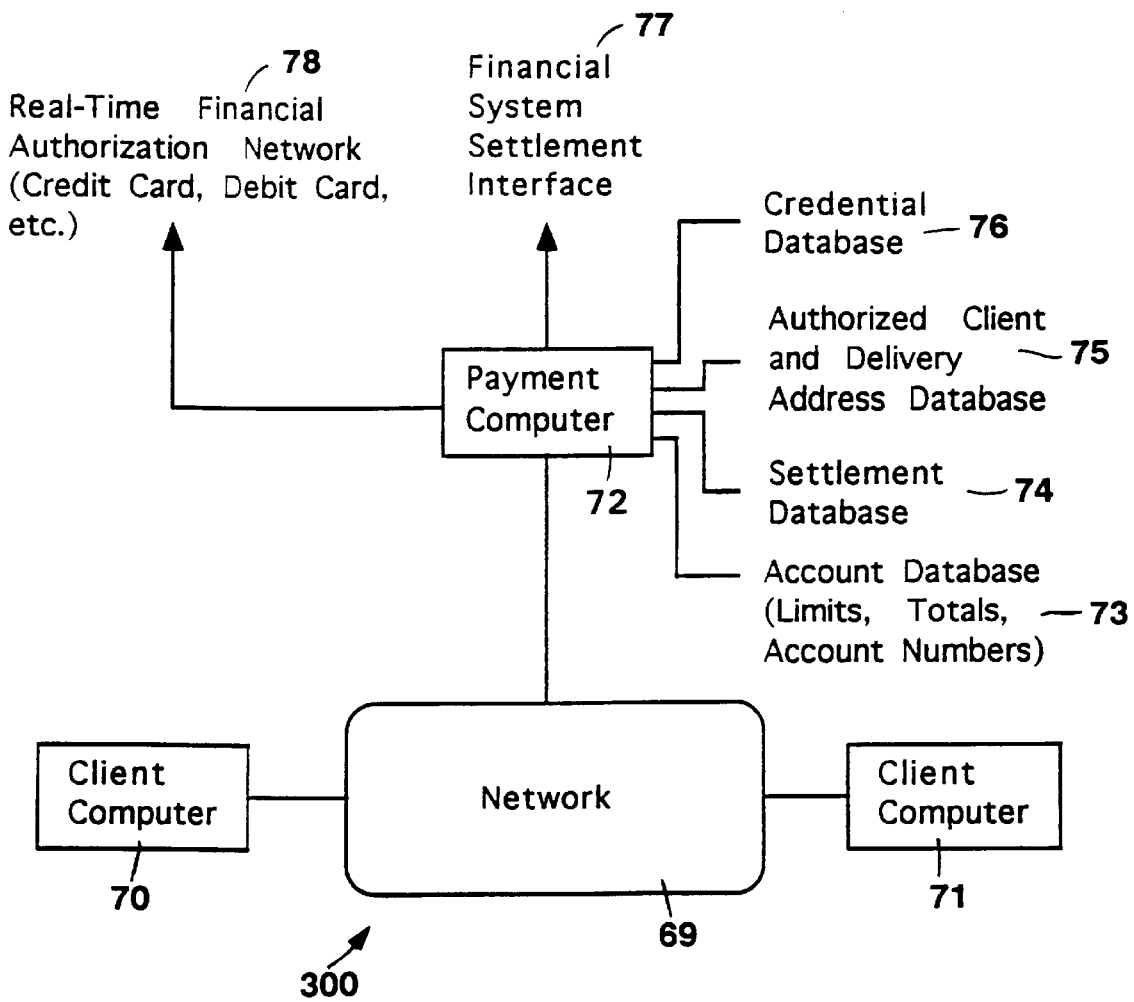
FIG. 13 is a block diagram of a typical network payment system in accordance with the invention.

A network payment system 300 as shown in FIG. 13, employs a public packet-switched network 69 to interconnect a plurality of client computers 70 and 71, and a plurality of payment computers such as 72, each payment computer having an account database 73, a settlement database 74, an authorized address database 75, a sender credential database 76, a financial system interface 77, and a real-time authorization interface 78. The interfaces 77 and 78 may be implemented by a single communications line.

In an alternate embodiment, the network payment system further includes external devices that are kept in the possession of users so that the users can authenticate themselves when they use a buyer computer.

Account database 73 maintains temporal spending amounts, such as the amount spent in the current day, and also maintains temporal spending limits. The account database may also maintain a translation between principal identifiers and external account identifiers. Settlement database 74 records committed payment orders along with any authorization information for the orders that was obtained from interface 78. Address database 75 maintains for each sender a list of authorized buyer computer and delivery addresses. Credential database 76 maintains a list of credentials for principals and information that can be used to authenticate principals.

Figure 14:
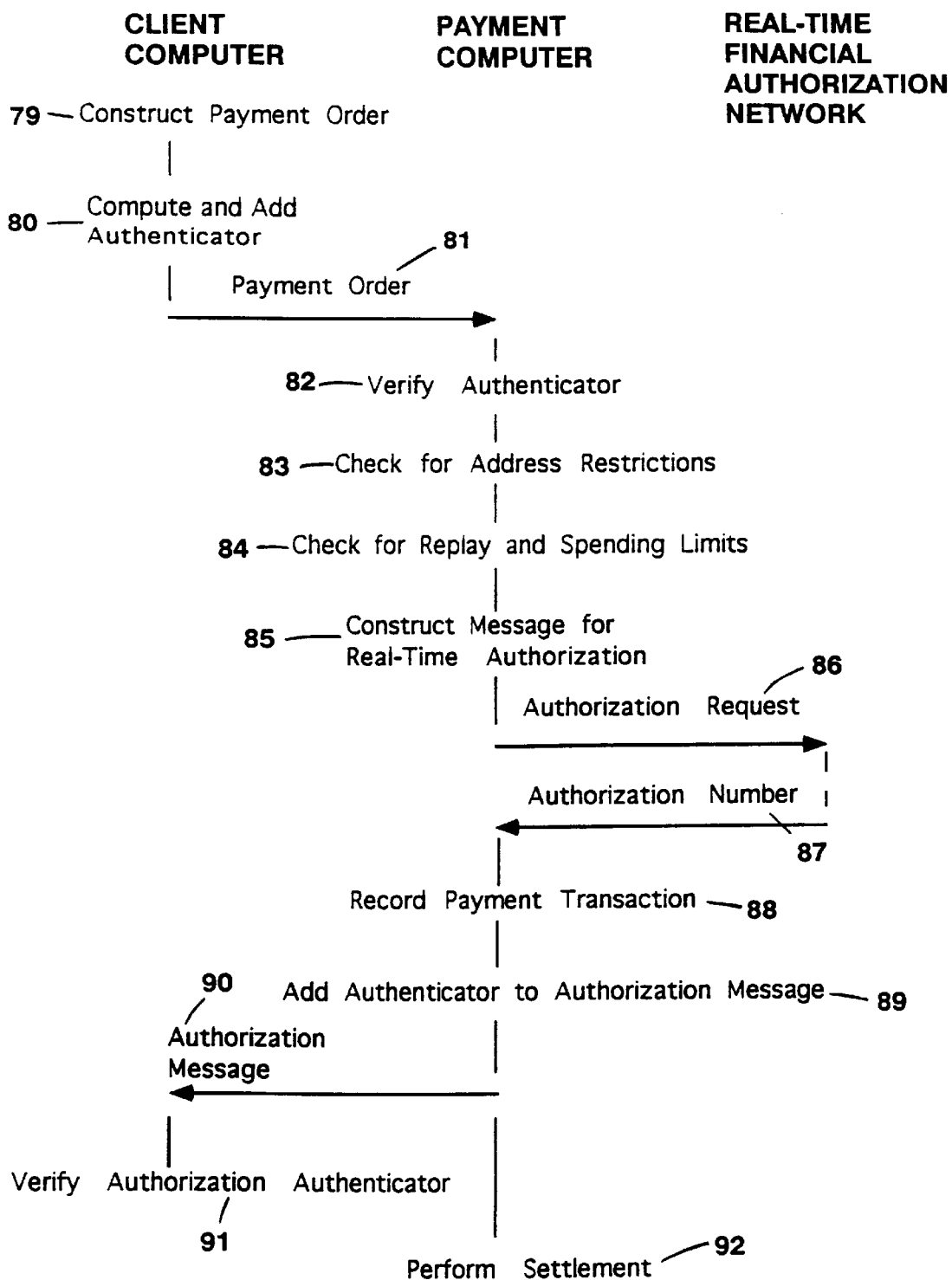
FIG. 14 is a flow chart illustrating the authentication, authorization, and settlement of a payment order.
Figure 16:
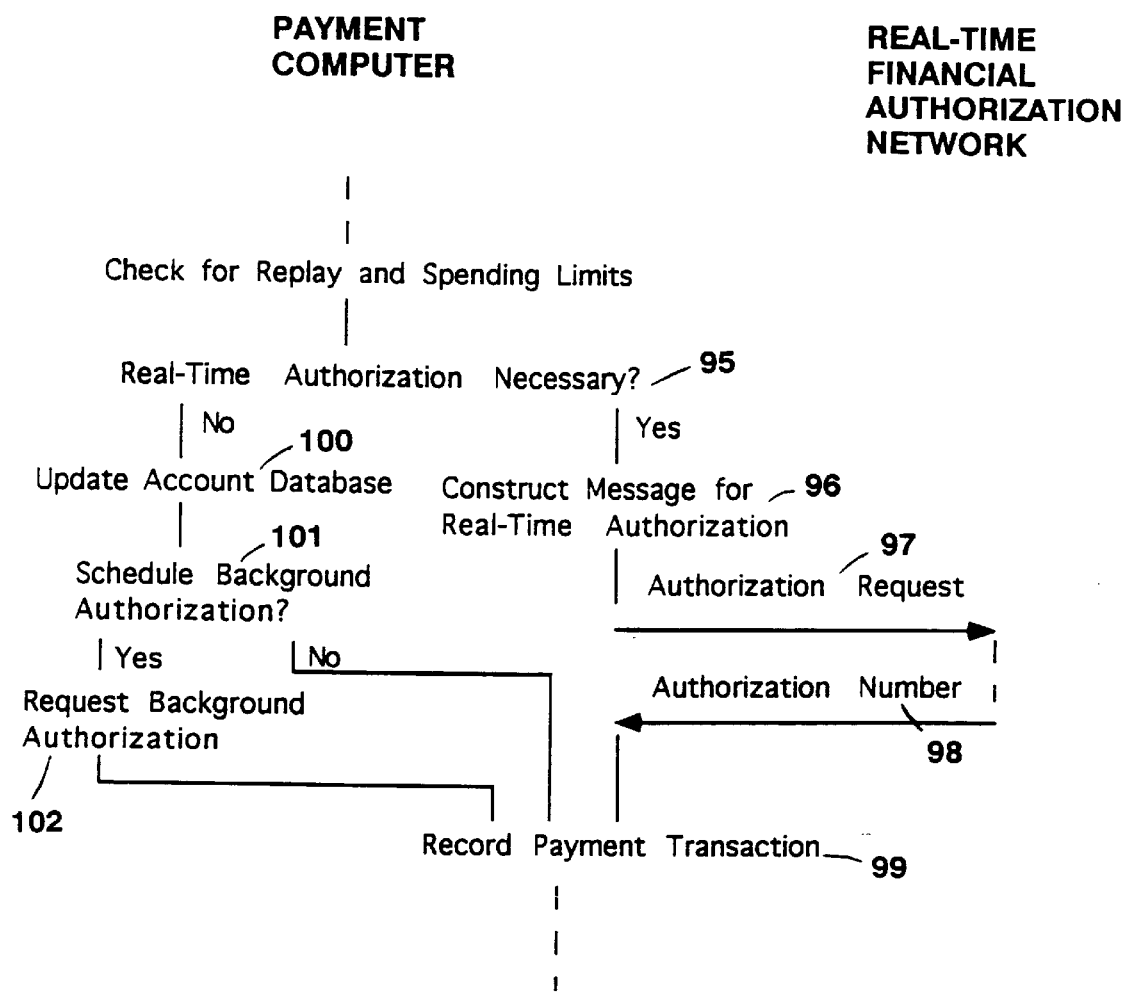
FIG. 16 is a flow chart illustrating an alternate processing of the authorization of a payment order where real-time approval from the financial authorization network may not be obtained.

FIG. 14 is a flowchart that describes the operation of the payment system. A client computer 71 constructs a payment order at 79, and computes and adds an authenticator to the payment order at 80. The payment order is sent at 81 to a payment computer, where the authenticator is verified at 82 to ensure that the payment order was originated by the sender it describes. Below we present different means of implementing 80 and 82.

If the payment order is authentic and address restrictions are desired, at 83, either or both of the client computer address or the specified delivery address can be checked against address database 75. If address restrictions are desired and if the addresses in the payment order are not in the database, the payment computer sends a rejection message to the client computer. Address database 75 specifies, for each principal, acceptable client computer addresses and delivery addresses. A delivery address can be a network address, or a street address for packaged goods. As is known in the art, database 75 can include wild-card specifications and similar techniques to reduce its size. For example, database 75 could contain an entry for principal identifier "*@acme.com" restricting legal delivery addresses to "computer: *.com", "computer: cmu.edu", and "surface: *, 34 Main Street, Anytown, U.S.A.", indicating that any user at the company Acme can order products to be delivered to the network address at Acme or the university CMU, or to anyone at 34 Main Street, Anytown, U.S.A.

If payment order address restrictions are not desired or have been checked, processing continues at 84 where the payment order is checked for replay and temporal spending limits. Replay is checked for by making sure that the sender did not previously present a payment order with the same nonce by checking an index of committed payment orders by nonce in settlement database 74. If nonces are based on time, then a payment order that is older than an administratively determined value can be rejected out of hand. Time based nonces or sequential nonces permit old nonces to be removed from the settlement database 74. If a payment order has been previously processed or its nonce is too old, the payment order computer sends a rejection message to the client.

After the payment order passes the replay check, temporal spending limits are checked in account database 73. These spending limits can be applied on a per sender, per group of senders, and per payment system basis to limit fraud risk. The limits can be applied to any duration of time, for example a maximum spending amount per hour or per day.

If the payment order would violate a spending limit, the payment computer sends a rejection message to the client.

Once the payment order passes the temporal spending check at 84, a message is constructed at 85 to check that the external account that backs the sender's payment system account has adequate funds or credit. If the sender identifier in the payment order is not already an account number in the external financial system, it is translated into a corresponding account number in the external financial system using account database 73. A real-time authorization request message is sent at 86 to the external financial system over interface 78. If the external financial system approves authorization request 86, an authorization message is returned at 87. If request 86 is not approved, the payment computer sends a rejection message to the client at 87.

In a variation of the above described approach, processing continues at 95 after 84. At 95 real-time authorization is only obtained when the total of a sender's payments since the last real-time authorization reaches a preset value, or the payment order is over a preset amount. These preset values can be optionally recorded on a per principal basis in database 73 or can be administratively determined for all principals. In this manner, the number of messages to the external financial system can be reduced. In addition, the payment system can avoid making real-time authorization requests for small payments when the risk is acceptable to the payment system operator. If real-time authorization is necessary, processing continues at 85 after 95. If real-time authorization is not necessary for a request, at 100 the payment order amount is added to the sender's total of payments since the last real-time authorization in database 73, and processing continues at 88.

In another variation after 100 a check is made at 101 in database 73 to see if a background authorization process should be scheduled. A background authorization process permits the payment computer to continue its normal processing while it checks with the financial authorization network on the sender's account. This mechanism can be used to limit payment system risk. If the background authorization fails, the account is suspended by so updating database 73. If the sender's total of payments since last authorization is over a preset value stored in 73 then a background authorization process is scheduled at 102. Otherwise processing continues at 88.

In another variation, at 95 and 101 authorizations are obtained based on the amount spent since last authorization and time since last authorization.

At 88 the payment order is committed to execution and is recorded in settlement database 74. Recorded with the payment order in database 74 are portions of authentication message 87 that show that the payment computer contacted the remote financial system. The amount of the payment order is added to running temporal spending records in database 73, and an authorization message is sent to the client computer at 90. The authorization message includes the payment order. In an alternate embodiment, at 90 the authorization message contains a truncated payment order that includes at least the payment order's sender and the payment order's unique nonce.

In an alternate embodiment, the authorization message sent to the client at 90 includes at least one legal delivery addresses for the sender as determined from database 75.

Authorization message 90 must be transmitted in such a way that the client computer can be sure that it came from the payment computer. At 89 a payment system specific authenticator is added payment order. At 91 this authenticator is checked by the client computer. The steps at 89 are a dual of step 80, and the steps at 91 are a dual of step 82. The authentication means for steps 89 and 91 are described below.

Finally, settlement is performed at 92 in the external financial system 77 between external accounts that correspond to the sender and the beneficiary. If settlement is accomplished as part of real-time authorization at steps 86 and 87, as may occur in a real-time debit network, then no other steps need to be taken. If settlement is not accomplished as part of the authorization process, then financial system messages are sent to interface 77 to effect settlement. Depending on the external accounts involved, these messages may include electronic funds transfer messages or automated clearinghouse messages.

In an alternate embodiment, at 92 settlement messages are sent to reconcile net transfer balances between principles on a temporal basis, for example once a day. In this embodiment the number of settlement messages can be less than the number of payment orders.

Authenticators may be created and checked using one of the following methods. The payment computer can use any of the first four methods, and the client computer can use any of the methods described.

In a first method for authenticators, at steps 80 or 89, a digest of the payment order is signed by the sending computer using a public-key cryptographic system such as RSA. This signature is used as the authenticator. As is well known in the art, the signing can be accomplished using a private key created from a public-key pair, where the signing key is only known by the signer, and the other public key is known to the receiving computer. At the payment computer the public key corresponding to each sender is kept in credential database 76. The private key for the payment service is also kept in database 76. At steps 82 or 91, the signature of the received message is checked using the public key known to the receiving computer.

In a second method for authenticators, at steps 80 or 89, a digest of the payment order is signed by the sending computer with a private key cryptosystem such as DES. This signature is used as the authenticator. At the payment computer, the private key corresponding to each sender is kept in credential database 76. At step 80, a digest of the payment order is signed by the client computer, and at step 89 a digest of the payment order with an added approval code is signed by the payment computer using the same private key. At steps 82 or 91, the signature of the received message is checked using the shared private key.

In a third method for authenticators, at step 80 the authenticator is computed by a protected device external to the system such as a Smart-Card. A protected device is specifically designed to be extremely difficult both to replicate and to compromise. In this method, the payment order is communicated at 80 to a Smart-Card. The Smart-Card computes and signs a digest of the payment order, and then communicates the signature back at 80 to be used as an authenticator. A Smart-Card produced authenticator uniquely associates a payment order with its creating Smart-Card. This is accomplished by having the Smart-Card contain a secret key "K" that is used to create a digital signature of the payment order. "K" is never released outside of the Smart-card. The Smart-Card is designed to make it computationally infeasible to compute "K" even with possession of the device. In this method, at step 82, a signature checking key from database 76 is used to check the authenticator. In an alternate embodiment, a user must manually signal their acceptance of each payment order on an input device that is part of the external device before the authenticator is created by the external device.

In a fourth method for authenticators, at steps 80 or 89, a network address is used as an authenticator. At steps 82 or 91, a digest of the payment order is sent back to the specified network address along with a random password. The computer at the specified network address must then return the payment order digest along with the password. If the network guarantees to deliver messages to the proper network address, this method will guarantee that the user or computer at the specified network address approves of the payment order. Assuming that network delivery is trusted, this method can be used to authenticate a sender computer's network address in a payment order. Alternatively, electronic mail can be used to send such confirmation messages between a user and the payment system.

In a fifth method for authenticators, at step 80, the authenticator is produced by an external device that produces a sequence of non-predicable transaction identifiers that are device specific. The authenticator is entered by the user into the client computer by reading its display. One such device is described in U.S. Pat. No. 4,856,062. According to this method, at step 91, the authenticator can be checked using the sender specific fixed code of the device which is kept in database 76. This sequence of steps is also shown in FIG. 15 at steps 93 and 94.

In a sixth method for authenticators, at step 80, the authenticator is obtained by querying the user for a transaction identifier that is the next string from a physical list of one-time authorization strings. Such as list could be produced on a card, and the user can cross off authorization strings as they are used. According to this method, at step 91, the authenticator is checked against the next expected string from the sender using database 76. Database 76 can hold for each sender a list of random authorization strings, or can hold a sender specific secret key that was used to generate the list of authentication strings along with how many strings have been used so far. This sequence of steps is also shown in FIG. 15 at 93 and 94.

In a seventh method for authenticators, at step 80 the authenticator is a previously obtained personal identification number (PIN) for the user. In this method in 91 the authenticator is checked against the expected PIN for the sender using database 76.

As will be obvious to one skilled in the art, any of the methods for creating authenticators can be used together to increase system security. For example, authenticator method six can be used to create an authenticator based on a transaction identifier, and then a payment order including a transaction identifier can be given a further authenticator using authenticator method one. In this example the resulting authenticators would be checked with their respective methods.

A digest of a payment order can be created with an algorithm such as MD5 [R. Rivest, The MD5 Message-Digest Algorithm, MIT Laboratory for Computer Science, Network Working Group Request for Comments 1321]. Alternatively, a digest can be the entire payment order or other functions of the payment order's component parts.

In addition in both the sales and payment systems alternate authenticator techniques can be used such as those described by Voydock and Kent in "Security Mechanisms in High-level Network Protocols", Computing Surveys Vol. 15, No. 2, June 1983. As will be appreciated by those skilled in the art, two-way authenticated byte-stream or remote procedure call interface connections that protect against replay can replace our message based authenticators.

Additions, subtractions, deletions, and other modifications of the described embodiment will be apparent to those practiced in the art and are within the scope of the following claims.

What is claimed is:

1. An open network sales system providing for real-time authorization of purchase transactions, comprising:

a plurality of buyer computers; and a plurality of merchant computers;

the plurality of buyer computers and the plurality of merchant computers being interconnected by a public packet switched communications network;

each of the buyer computers being programmed to transmit a purchase message, in response to a user request, over the public packet switched communications network to at least one of the merchant computers and to cause a payment request, comprising a payment amount, to be transmitted over the public packet switched communications network into a payment system, in order to initiate generation by the payment system of an authorization message authorizing purchase of a product having real monetary value;

at least one of the merchant computers being programmed to receive at least one of the purchase message and the authorization message, and to cause the product to be sent to a party conditioned on the purchase transaction having been authorized in real time, based on an external credit card account or an external demand deposit account having sufficient credit or funds of real monetary value available to a principal making the payment, without the merchant computer receiving the number of the external credit card account or the number of the external demand deposit account;

the at least one message received by the merchant computer comprising at least one digital signature of components that include components derived from the at least one message, at least one of which digital signatures protects the at least one message from forgery, including authenticating an identity of an originator of the at least one message, and at least one of which digital signatures is computed based on a secret key specific to the payment system;

the at least one message received by the merchant computer being configured such that the merchant computer cannot compute therefrom the number of the external credit card account or of the external demand deposit account.

2. The network sales system of claim 1 wherein:

at least one of the plurality of merchant computers is programmed to store digital advertisements in a database;

each one of the buyer computers is programmed to receive a user inquiry at one of the buyer computers and, in response to the user inquiry, to select one of the merchant computers and to transmit a network request thereto over the public packet switched communications network;

at least one of the merchant computers is programmed to cause one of the digital advertisements to be communicated to the one of the buyer computers over the public packet switched communications network in response to the network request from the buyer computer;

the one of the buyer computers is programmed to display the one of the digital advertisements, and the product having real monetary value is advertised in the one of the digital advertisements.

3. The network sales system of claim 1 wherein the payment system comprises a financial authorization network external to the public packet switched communications network programmed to authorize the purchase transaction in real time.

4. The network sales system of claim 1 wherein the one of the buyer computers is programmed to cause the payment request to be transmitted into the payment system in order to initiate recordation of information pertaining to the payment request and an authorization to be recorded.

5. The network sales system of claim 4 wherein the information pertaining to the payment request and the authorization is recorded in a settlement database.

6. The network sales system of claim 1 wherein:
at least one of the digital signatures protects the at least one message received by the merchant computer from replay attack; and
the one of the merchant computers is programmed to cause the product to be sent conditioned on the at least one message received by the merchant computer not being a replay of a message previously transmitted over the public packet switched communications network.

7. The network sales system of claim 1 wherein each of the buyer computers is programmed to transmit the purchase message to at least one of the merchant computers before the payment request is transmitted into the payment system.

8. The network sales system of claim 1 wherein each of the buyer computers is programmed to transmit the purchase message to at least one of the merchant computers after the payment request is transmitted into the payment system.

9. A method of effecting sales over a network sales system comprising a plurality of buyer computers and a plurality of merchant computers interconnected by a public packet switched communications network, the method providing for real-time authorization of purchase transactions and comprising the steps of:
in response to a user request, transmitting over the public packet switched communications network from one of the buyer computers to one of the merchant computers a purchase message, and causing a payment request, comprising a payment amount, to be transmitted over the public packet switched communications network into a payment system, in order to initiate generation by the payment system of an authorization message authorizing purchase of a product having real monetary value; and
receiving at least one of the purchase message and the authorization message at one of the merchant computers, and causing the product to be sent to a party conditioned on the purchase transaction having been authorized in real time, based on an external credit card account or an external demand deposit account having sufficient credit or funds of real monetary value available to a principal making the payment, without the merchant computer receiving the number of the external credit card account or the number of the external demand deposit account;
the at least one message received by the merchant computer comprising at least one digital signature of components that include components derived from the at least one message, at least one of which digital signatures protects the at least one message from forgery, including authenticating an identity of the payment system as an originator of the at least one message, and at least one of which digital signatures is computed based on a secret key specific to the payment system;
the at least one message received by the merchant computer being configured such that the merchant computer cannot compute therefrom the number of the external credit card account or the external demand deposit account.

10. An open network sales system providing for real-time authorization of purchase transactions, comprising:
a plurality of buyer computers; and
a plurality of merchant computers;
the plurality of buyer computers and the plurality of merchant computers being interconnected by a public packet switched communications network;
at least one of the buyer computers being programmed to receive a user inquiry and, in response to the user inquiry, to select at least one of the merchant computers and to transmit a network request thereto as at least one message over the public packet switched communications network;
at least one of the merchant computers being programmed to cause a digital advertisement to be communicated to the one of the buyer computers in at least one message over the public packet switched communications network in response to the network request from the buyer computer;
the one of the buyer computers being programmed to display the digital advertisement, and, in response to a user request, to transmit a purchase request to at least one of the merchant computers as at least one message over the public packet switched communications network;
at least one of the merchant computers being programmed to receive the purchase request, to cause the product to be sent to a party conditioned on the purchase transaction having been authorized in real time by a financial authorization network external to the public packet switched communications network based on an external credit card account or an external demand deposit account having sufficient credit or funds of real monetary value available to a principal making the payment, and to cause a fulfillment response to be sent to the buyer computer as at least one message over the public packet switched communications network;
at least one of the messages transmitted between the buyer computer and the merchant computer over the public packet switched communications network comprising at least one encrypted digest computed from components that include components derived from the message, at least one of which encrypted digests protects components of the message from forgery, at least one of which encrypted digests authenticates one of a plurality of principles as an originator of components of the message, at least one of which encrypted digests protects the message from all replay attacks that result in loss of value, and at least one of which encrypted digests is verified using a principal-specific public key.

11. A method of effecting sales over a network sales system comprising a plurality of buyer computers and a plurality of merchant computers interconnected by a public packet switched communications network, the method providing for real-time authorization of purchase transactions and comprising the steps of:
receiving a user inquiry at a buyer computer, and, in response to the user inquiry, selecting at least one of the merchant computers and transmitting a network request thereto as at least one message over the public packet switched communications network;
causing a digital advertisement to be communicated to the one of the buyer computers in at least one message over the public packet switched communications network in response to the network request from the buyer computer;

displaying the digital advertisement at the buyer computer, and, in response to a user request, transmitting a purchase request to at least one of the merchant computers as at least one message over the public packet switched communications network;

receiving the purchase request at one of the merchant computers, causing the product to be sent to a party conditioned on the purchase transaction having been authorized in real time by a financial authorization network external to the public packet switched communications network based on an external credit card account or an external demand deposit account having sufficient credit or funds of real monetary value available to a principal making the payment, and causing a fulfillment response to be sent to the buyer computer as at least one message over the public packet switched communications network;

at least one of the messages transmitted between the buyer computer and the merchant computer over the public packet switched communications network comprising at least one encrypted digest computed from components that include components derived from the message, at least one of which encrypted digests protects components of the message from forgery, at least one of which encrypted digests authenticates one of a plurality of principles as an originator of components of the message, at least one of which encrypted digests protects the message from all replay attacks that result in loss of value, and at least one of which encrypted digests is verified using a principal-specific public key.

12. The network sales system of claim 1 wherein the buyer computer is programmed to cause the payment request to be transmitted into the payment system by transmitting the payment request directly into the payment system.

* * * * *